United States Patent
Zeh et al.

(10) Patent No.: US 11,956,188 B1
(45) Date of Patent: Apr. 9, 2024

(54) SECURITY AWARE ROUTING IN AN IN-VEHICLE COMMUNICATION NETWORK

(71) Applicant: Infineon Technologies AG, Neubiberg (DE)

(72) Inventors: Alexander Zeh, Munich (DE); Anjana Ramamoorthy, Munich (DE); Donjete Elshani Rama, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/065,416

(22) Filed: Dec. 13, 2022

(51) Int. Cl.
*H04L 51/04* (2022.01)
*H04L 51/226* (2022.01)
*H04L 67/12* (2022.01)

(52) U.S. Cl.
CPC ............ *H04L 51/04* (2013.01); *H04L 51/226* (2022.05); *H04L 67/12* (2013.01)

(58) Field of Classification Search
CPC ....... H04L 47/50; H04L 51/226; H04L 67/12; B60R 16/023
See application file for complete search history.

(56) References Cited

U.S. PATENT DOCUMENTS

| | | | | |
|---|---|---|---|---|
| 9,960,871 | B1* | 5/2018 | Mizrahi | .............. H04L 63/0485 |
| 2013/0083679 | A1* | 4/2013 | Krishnaswamy | ....... H04L 67/61 |
| | | | | 370/252 |
| 2014/0038137 | A1* | 10/2013 | Hill | .......................... B60Q 9/00 |
| | | | | 340/407.1 |
| 2015/0143505 | A1* | 5/2015 | Border | ................ H04L 63/0209 |
| | | | | 726/15 |
| 2015/0207793 | A1* | 7/2015 | Mohamed | ............. H04L 63/168 |
| | | | | 726/6 |
| 2018/0367554 | A1* | 12/2018 | Allouche | ............... G06F 21/554 |
| 2019/0288788 | A1* | 9/2019 | Bengtsson | ............ H04L 1/0018 |
| 2020/0145433 | A1* | 5/2020 | Gutierrez | ................. G06N 3/08 |
| 2021/0271739 | A1* | 9/2021 | Zeh | ........................ G06F 21/606 |
| 2021/0329065 | A1* | 10/2021 | Wang | .................. H04L 67/1053 |
| 2022/0038903 | A1* | 2/2022 | Fu | ........................ H04W 12/106 |
| 2022/0070006 | A1* | 3/2022 | Jetzfellner | ............ H04L 9/3236 |
| 2022/0150091 | A1* | 5/2022 | Mutter | .............. H04L 12/40169 |
| 2022/0191140 | A1* | 6/2022 | Wang | ...................... H04L 45/74 |

(Continued)

OTHER PUBLICATIONS

M. J. Dworkin, "SP 800-38D. Recommendation for Block Cipher Modes of Operation: Galois/Counter Mode (GCM) and GMAC," National Institute of Standards & Technology, Gaithersburg, MD, United States, Nov. 2007, 39 pages.

(Continued)

*Primary Examiner* — Schquita D Goodwin
*Assistant Examiner* — Linh T. Nguyen
(74) *Attorney, Agent, or Firm* — Harrity & Harrity, LLP

(57) ABSTRACT

A controller may receive a message provided by a network node included in an in-vehicle communication network. The controller may identify one or more characteristics of the message, the one or more characteristics indicating at least one of a message type of the message, a security property of the message, or a secure zone (SZ) associated with the message. The controller may determine a priority of the message based at least in part on the one or more characteristics. The controller may provide the message to an output buffer based at least in part on the priority of the message, the output buffer being one of a plurality of output buffers.

20 Claims, 10 Drawing Sheets

(56) References Cited

U.S. PATENT DOCUMENTS

2022/0295283 A1* 9/2022 Joo ..................... H04W 12/088
2022/0413907 A1* 12/2022 Sekiya .................. G16Y 20/00
2023/0067338 A1* 3/2023 Zhong .................. H04L 69/321

OTHER PUBLICATIONS

R. Beaulieu et al., "SIMON and SPECK: Block Ciphers for the Internet of Things," National Security Agency, Fort Meade, MD, United States, Jul. 2015, 15 pages.

"IEEE Standard for Local and Metropolitan Area Networks—Port-Based Network Access Control," IEEE Std 802.1X-2020 (Revision of IEEE Std 802.1X-2010 Incorporating IEEE Std 802.1Xbx-2014 and IEEE Std 802.1Xck-2018), Feb. 2020, pp. 1-289.

J. Schaad et al., "Advanced Encryption Standard (AES) Key Wrap Algorithm," Internet Engineering Task Force, Request for Comments RFC 3394, RSA Laboratories, Sep. 2002, 41 pages.

* cited by examiner

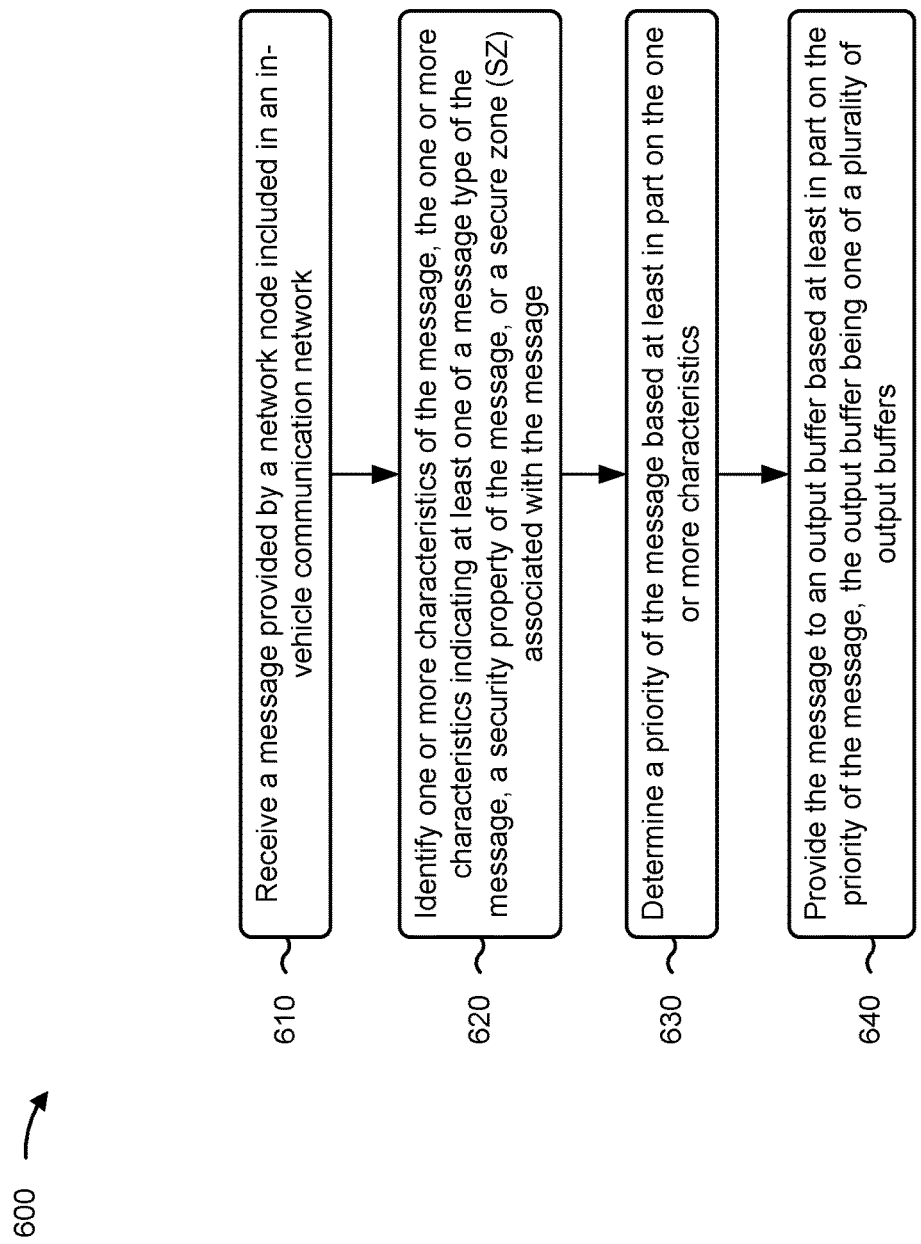

SECURITY AWARE ROUTING IN AN IN-VEHICLE COMMUNICATION NETWORK

BACKGROUND

A bus-based communication system is a system comprising one or more communication buses that interconnect network nodes of a communication network. An individual network node can include, for example, a sensor, an actuator, a controller, and/or another device that is used by the system to perform a function. An in-vehicle communication network may comprise one or more bus-based communication systems. In an in-vehicle communication network, a network node can correspond to a sensor, an actuator, and/or an electronic control unit (ECU) (e.g., an engine control module (ECM), a powertrain control module (PCM), a transmission control module (TCM), a brake control module (BCM), a central control module (CCM), a central timing module (CTM), a general electronic module (GEM), a body control module (BCM), a suspension control module (SCM), and/or the like) that performs operations associated with a function of a vehicle. Network nodes within a bus-based communication system communicate with one another via the communication bus using strings of bits, or frames, that are serially transmitted and/or received according to a message-based communication protocol. One type of protocol used in bus-based systems is a controller area network (CAN) protocol. The CAN protocol can be used for in-vehicle communication networks in vehicles (e.g., road vehicles, off-road vehicles, marine vehicles, aerial vehicles, and/or the like), and can also be used for other applications (e.g., industrial systems, medical systems, robotics systems, and/or the like). The CAN protocol may facilitate safe operation of a vehicle by providing reliable message delivery, non-conflicting messages, and acceptable delivery time, while also being relatively low cost and noise resilient, and supporting redundant routing. Variants of the CAN protocol include CAN extra-long (CAN XL) protocol and CAN flexible data-rate (CAN FD) protocol.

SUMMARY

In some implementations, an in-vehicle communication network controller includes one or more components configured to: receive a message provided by a network node included in an in-vehicle communication network; identify one or more characteristics of the message, the one or more characteristics indicating at least one of: a message type of the message, a security property of the message, or a secure zone (SZ) associated with the message; determine a priority of the message based at least in part on the one or more characteristics; and provide the message to an output buffer based at least in part on the priority of the message, the output buffer being one of a plurality of output buffers.

In some implementations, a method includes receiving, by a controller included in an in-vehicle communication network, a message provided by a network node included in the in-vehicle communication network; identifying, by the controller, one or more characteristics of the message, the one or more characteristics indicating at least one of: a message type of the message, a security property of the message, or an SZ associated with the message; determining, by the controller, a priority of the message based at least in part on the one or more characteristics; and providing, by the controller, the message to an output buffer based at least in part on the priority of the message, the output buffer being one of a plurality of output buffers.

In some implementations, a controller includes one or more components configured to: identify one or more characteristics of a message, the one or more characteristics indicating at least one of: a message type of the message, a security property of the message, or an SZ associated with the message; determine a priority of the message based at least in part on the one or more characteristics; and provide the message to an output buffer based at least in part on the priority of the message.

BRIEF DESCRIPTION OF THE DRAWINGS

FIG. 6 is a flowchart of an example process associated with security aware routing in an in-vehicle communication network.

DETAILED DESCRIPTION

The following detailed description of example implementations refers to the accompanying drawings. The same reference numbers in different drawings may identify the same or similar elements.

As described above, a bus-based communication system may include a network of one or more communication buses that interconnect network nodes of a communication network (e.g., an in-vehicle system, a vehicle system, an industrial system, a medical system, a robotics system, and/or the like). A network node may include, for example, a sensor, an actuator, a controller, or another device that is used to perform a function of the associated system. In a vehicle, for instance, a network node may correspond to a sensor, an actuator, or an ECU that is associated with a throttle function, a steering function, a braking function, a gear selection function, and/or another function of the vehicle.

In general, a network node of a bus-based communication system may communicate with other network nodes on a communication bus via frames (e.g., strings of bits) that are serially transmitted and/or received according to a message-based communication protocol. For example, a network node may transmit a frame of dominant and/or recessive bits that can be interpreted by another network node as information provided via a sensor, information for controlling an actuator, an operating parameter, or an operating condition, among other examples.

Figure 1A:
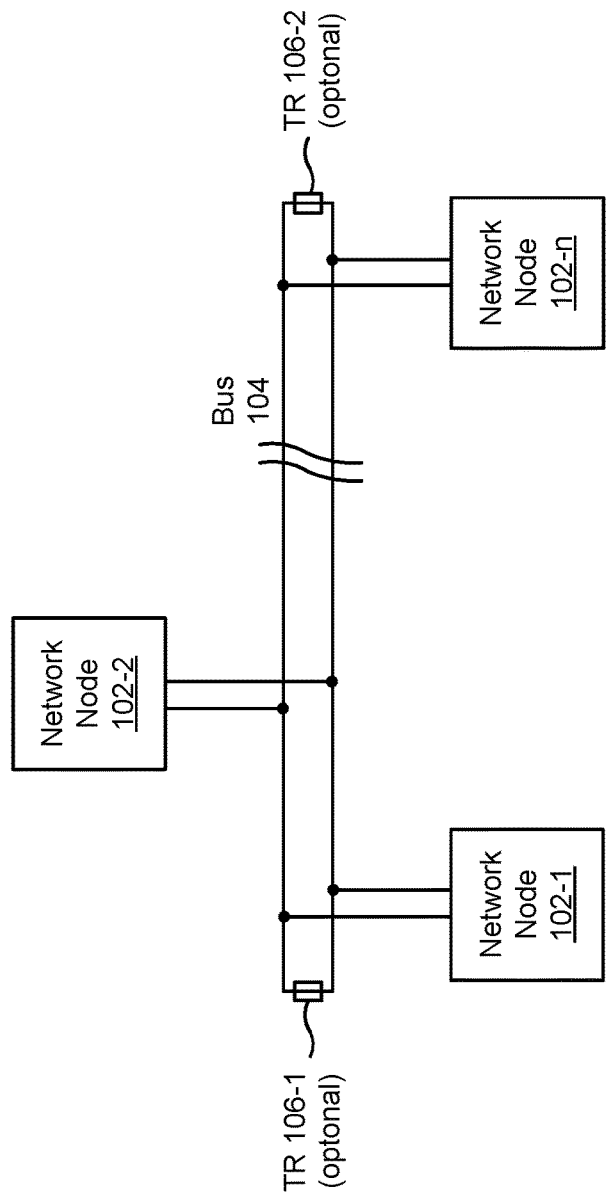
FIG. 1A is a diagram illustrating an example of a bus-based communication system.

FIG. 1A is a diagram illustrating an example of a bus-based communication system 100. FIG. 1A illustrates an example of a bus-based communication system 100 connecting a group of network nodes 102 (e.g., network node 102-1 through network node 102-n (n>1)). In the example of FIG. 1A, a communication bus 104 is shown as a two-line bus system, which may be implemented as two differential lines. Notably, other implementations of a communication bus are possible. In bus-based communication system 100, a network node 102 may selectively apply a direct current (DC) voltage signal across the bus terminals to transmit a dominant bit or a recessive bit. For example, a network node 102 may transmit a dominant bit (e.g., a logical "0" bit) by driving the high bus terminal to a high voltage (e.g., 5 volts DC (VDC)) and by driving the low bus terminal to a low voltage (e.g., 0 VDC), and may transmit a recessive bit (e.g., a logical "1" bit) by driving neither bus terminal. The bus terminals may extend between the network nodes 102 and enable information (e.g., information provided via a sensor, information for controlling an actuator, an operating parameter, or an operating condition, among other examples) to be communicated between the network nodes 102. As further shown in FIG. 1A, the bus-based communication system 100 may be terminated with (optional) termination resistors 106-1 and 106-2, which may serve to reduce reflections on the communication bus 104 that could otherwise affect signal quality along the communication bus 104.

In some cases, the network nodes 102 of the bus-based communication system 100 may communicate with one another according to a message-based communication protocol. For example, the network node 102-1 may transmit a message as a frame of bits that are serially introduced into the communication bus 104 and serially received by the network node 102-2. A frame may generally include one or more designated fields that provide different types of information relating to the message contained in the frame. Notably, in the bus-based communication system 100, a message transmitted by any network node 102 is broadcast on the communication bus 104, meaning that any other network node 102 can receive the message on the communication bus 104.

Examples of protocols that may be used in a bus-based communication system 100 include CAN protocol, CAN FD protocol, CAN XL protocol, local interconnect network (LIN) protocol, and an Ethernet protocol (e.g., 10base-T1S protocol). Notably, while implementations described herein are described in the context of CAN variants, such as CAN XL, the techniques described herein may be applied to other types of bus-based communication systems.

An in-vehicle communication network may include one or more bus-based communication systems 100. A bus-based communication system 100 in an in-vehicle communication network may have particular attributes reflecting requirements for in-vehicle networks. As an example, an in-vehicle bus-based communication system 100 may support communication of sensor data to a control unit by data frames being transmitted from the sensor or a control unit of the sensor to a control unit on a higher level. A particular protocol may be used for the data frames or protocol frames communicated between individual network nodes or participants of the bus-based communication system 100. In return or in response to receipt of sensor data, the control unit of the sensor or the control unit on the higher level may communicate information associated with an action to an actuator coupled to the bus. As a particular example, with reference to FIG. 1A, network node 102-1 may represent an angle sensor measuring an angle of a brake pedal. Network node 102-1 may transmit information indicating the measured angle in one or more protocol frames to network node 102-2, which may be an ECU. In response to receiving the information associated with the angle, the network node 102-2 may transmit one or more bus frames to network node 102-n, which may be a brake actuator. These frames, when received by the network node 102-n, may cause a braking action. Bus-based communications related to such an action are time critical and, therefore, should be transmitted, received, and processed quickly (e.g., in real-time or near real-time). Such timing requirements are not common in a typical communication network.

Further, in-vehicle communication networks typically have a well-defined number of network nodes that, generally, remain constant over a lifetime of a vehicle. Likewise, existing links between individual network nodes are not likely to be altered over the lifetime of the vehicle and, therefore, a topology of a given bus-based communication system 100 in an in-vehicle communication network is likely to remain constant. In a conventional computer network, such a situation is unlikely.

In a bus-based communication system 100, authenticity of a protocol frame transmitted over the communication bus 104 may be desirable, particularly in association with controlling a function of a vehicle. Taking a braking action as an example, a command causing an emergency braking should not be mistaken for a gentle braking when parking the vehicle in a controlled manner. To this end, an indication of authenticity of a frame communicated between participants of the bus-based communication system is advantageous. In some cases, authenticity of a frame can be provided at a data link layer (layer 2) of a given network node 102. In general, indicating authenticity of a protocol frame on a data link layer eliminates involvement of higher layers in authentication of (time-critical) commands communicated between participants of the bus-based communication system.

Further, with increasingly capable entertainment systems and increasing vehicle-to-vehicle communications, there is an increasing susceptibility to malicious commands or protocol frames being injected to a bus-based communication system 100 in an in-vehicle communication network. Therefore, bus-based communication system 100 may be configured to provide data security for frames (e.g., to prevent injection of the malicious frames). In some cases, data security can be provided at the data link layer or at a transport layer (layer 3). In some cases, data security may be provided on one or more other layers (e.g., one or more upper or lower layers) other than the transport layer and the data link layer.

The number and arrangement of devices shown in FIG. 1A are provided as examples. In practice, there may be additional devices, fewer devices, different devices, or differently arranged devices than those shown in FIG. 1A. Furthermore, two or more devices shown in FIG. 1A may be implemented within a single device, or a single device shown in FIG. 1A may be implemented as multiple, distributed devices. Additionally, or alternatively, a set of devices (e.g., one or more devices) of FIG. 1A may perform one or more functions described as being performed by another set of devices of FIG. 1A. For example, while bus-based communication system 100 is shown with two bus terminals, the communication bus 104 may interconnect the network nodes 102 using a different number of bus terminals and/or using a different arrangement of bus terminals that interconnect a different arrangement of network nodes 102. As another example, the communication bus 104 may be arranged in another topology, such as a ring topology (e.g., in which ends of the communication bus are electrically coupled to a single master unit). As another example, the communication bus 104 may comprise a plurality of communication buses 104 and/or be in selective communication with one or more additional communication buses 104.

Figure 1B:
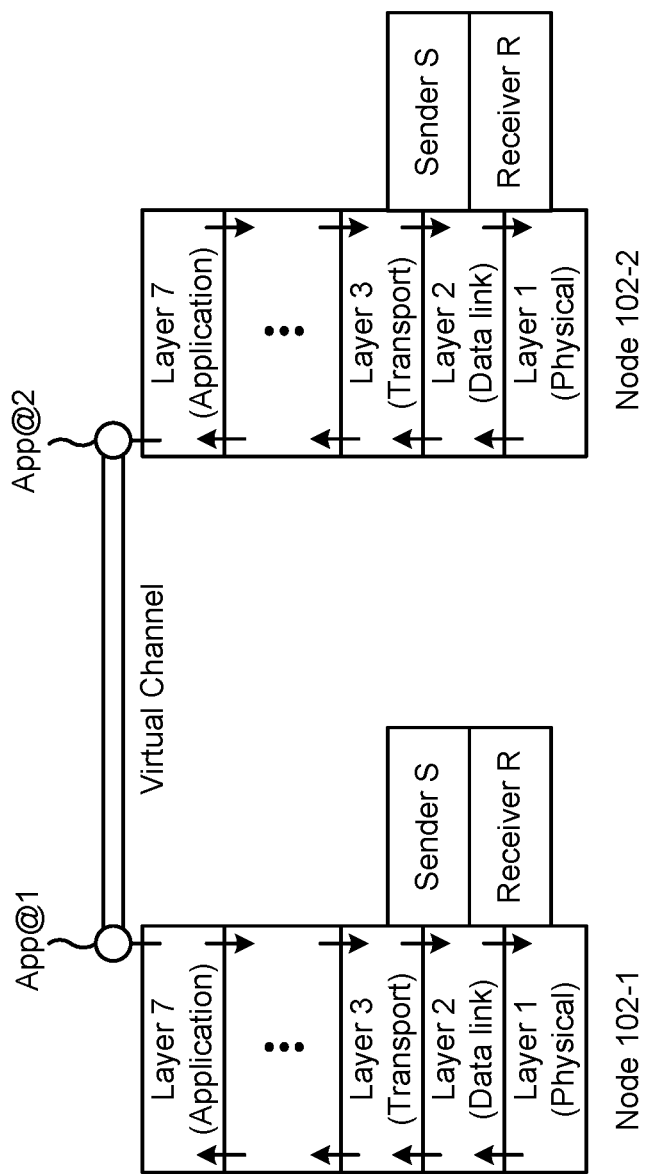
FIG. 1B illustrates an example of a communication stack and virtual channels between a pair of network nodes of a bus-based communication system.

FIG. 1B illustrates an example of a communication stack and virtual channels between a pair of network nodes 102 of a bus-based communication system 100, with network node 102-1 and network node 102-2 being shown as an example. As shown in FIG. 1B, communication between network node 102-1 and network node 102-2 flows in layers that can be categorized according to, for example, the OSI-ISO layer model. The lowest level layer (layer 1) is referred to as the physical layer. Each layer in the model can accept an order from a higher layer, perform some action at its level, and trigger a task in a lower layer by forwarding a request to the lower layer. For example, a command to the data link layer (layer 2) may be received from the transport layer (layer 3), as indicated by the downward arrow between the transport layer and the data link layer. Similarly, a command to the physical layer (layer 1) may be received from the data link layer, as indicated by the downward arrow between the physical layer and the data link layer. The physical layer of network node 102-1 may use a connection or link to network node 102-2 in order to communicate data on the physical layer to network node 102-2. Similarly, network node 102-1 may receive data from network node 102-2 over the physical link between network node 102-1 and network node 102-2. Here, the physical layer of network node 102-1 may forward the received data to the data link layer and, after processing at the data link layer, the data link layer may forward data to the transport layer. This forwarding is indicated by the upward arrow between the physical layer and the data link layer of network node 102-1 and the upward arrow between the data link layer and the transport layer of network node 102-1. The protocol flow in network node 102-2 is similar to that of network node 102-1. Notably, some existing bus-based communication networks within in-vehicle communication networks do not follow the separation of the physical layer and the data link layer as suggested in the OSI-ISO model. To reflect this, a sender S and receiver R are depicted in FIG. 1B as extending over the physical layer and the data link layer.

In some cases, techniques for providing authenticity of data communication in vehicles are implemented in the application layer (layer 7) using a software stack, indicated as App@1 and App@2 in FIG. 1B. Further, it may be useful to introduce a concept of virtual channels between network node 102-1 and network node 102-2 to indicate an authenticated and/or protected communication between two or more participants using the software stacks App@1 and App@2. One example associated with providing security for onboard networks, in a vehicle using software stacks, is secure onboard communication (SEC OC) according to the automotive open system architecture (AUTOSAR) standard. In some bus-based communication systems 100, functionality pertaining to authenticity and/or data security is limited to one or two lower layers of an individual network node 102 of the bus-based communication system 100. Limiting the authenticity and/or data security functionality to, for example, the data link layer and/or the transport layer may eliminate a need for higher protocol layers to be involved in data integrity and/or data security operations, thereby reducing an amount of time needed to receive, transmit, or process a given communication over the bus-based communication system 100.

The number and arrangement of layers shown in FIG. 1B are provided as one or more examples. In practice, there may be additional layers, fewer layers, different layers, or differently arranged layers than those shown in FIG. 1B. Furthermore, two or more layers shown in FIG. 1B may be implemented within a single layer, or a single layer shown in FIG. 1B may be implemented as multiple, distributed layers. Additionally, or alternatively, a set of layers (e.g., one or more layers) of FIG. 1B may perform one or more functions described as being performed by another set of layers of FIG. 1B.

Figure 1C:
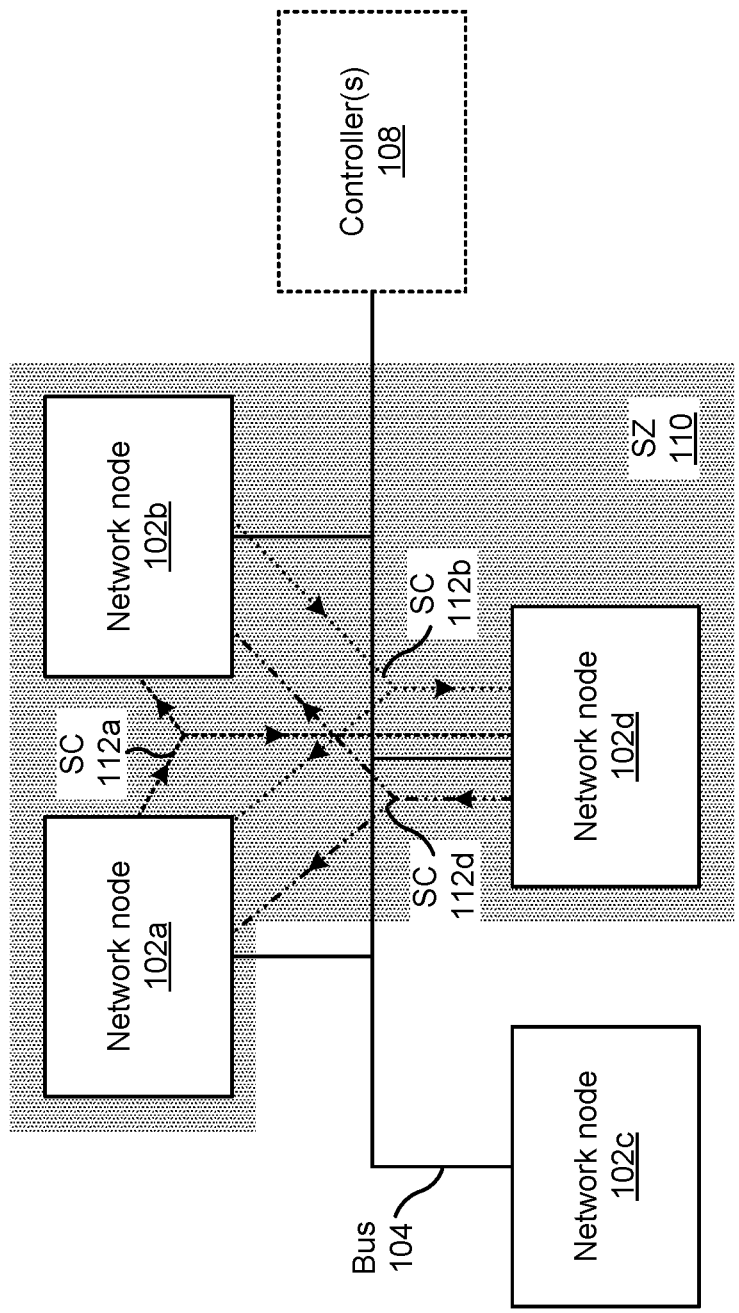
FIG. 1C is a diagram illustrating an example of environment that enables secure communication between network nodes of an in-vehicle communication network comprising one or more bus-based communication systems.

FIG. 1C is a diagram illustrating an example of environment that enables secure communication between network nodes 102 as described herein. As shown, the example bus-based communication system 100 in FIG. 1C includes a plurality of network nodes 102 (e.g., network nodes 102a through 102d are shown in FIG. 1C) and one or more controllers 108 connected to the communication bus 104. In some implementations, two or more network nodes 102 shown in FIG. 1C may be included in the same bus-based communication system 100. In some implementations, two or more network nodes 102 shown in FIG. 1C may spread across multiple bus-based communication systems 100 (e.g., two or more bus-based communication systems 100 that are connected by one or more controllers 108).

A controller 108 is a device configured to control or manage operation of one or more network nodes 102 of one or more bus-based communication systems 100. For example, the controller 108 may be configured to receive a message from a first network node 102 (e.g., network node 102a), where the message is destined for a second network node 102 (e.g., network node 102b). The controller 108 may determine a priority of the message based at least in part on one or more characteristics of the message, and may provide the message to an output buffer for transmission to the second network node 102 based at least in part on the priority of the message, as described herein. In some implementations, the controller 108 may be configured to control or manage operation of one or more network nodes 102 within a single bus-based communication system 100 or a plurality of network nodes 102 across multiple bus-based communication systems 100 that are connected via the controller 108.

As shown in FIG. 1C, one or more network nodes 102 of the one or more bus-based communication systems 100 may be included a secure zone (SZ) 110 defined by a set of secure channels (SCs) 112. In the example shown in FIG. 1C, network node 102a, network node 102b, and network node 102d are included in the SZ 110, and the SZ 110 includes an SC 112a, an SC 112b, and an SC 112d. In some implementations, the SZ 110 may be within a single bus-based communication system 100 or may span multiple bus-based communication systems 100 (e.g., through one or more gateways). As indicated above, the SZ 110 may be defined by a set of SCs 112 that enable network nodes 102 to securely transmit and receive communications.

In some implementations, an SC 112 is a unidirectional transmission channel. In some implementations, an SC 112 is a point-to-multipoint transmission channel. Alternatively, an SC 112 may in some implementations be a point-to-point transmission channel. In the example shown in FIG. 1C, the SC 112a is a unidirectional, point-to-multipoint channel that enables the network node 102a to transmit secure communications to the network node 102b and the network node 102d. Similarly, the SC 112b is a unidirectional, point-to-multipoint channel that enables the network node 102b to transmit secure communications to the network node 102a and the network node 102d. Further, the SC 112d is a unidirectional, point-to-multipoint channel that enables the network node 102d to transmit secure communications to the network node 102a and the network node 102b. In some implementations, each SC 112 of the SZ 110 is associated with an SC identifier (SCI) that is unique within the one or more bus-based communication systems 100.

In some implementations, an SC 112 may have one or more secure associations (SAs). An SA is a security parameter of the SC 112 based on which a security key can be identified. In some implementations, a given SC 112 may have multiple SAs (e.g., two SAs).

The number and arrangement of layers shown in FIG. 1C are provided as one or more examples. In practice, there may be additional layers, fewer layers, different layers, or differently arranged layers than those shown in FIG. 1C. Furthermore, two or more layers shown in FIG. 1C may be implemented within a single layer, or a single layer shown in FIG. 1C may be implemented as multiple, distributed layers. Additionally, or alternatively, a set of layers (e.g., one or more layers) of FIG. 1C may perform one or more functions described as being performed by another set of layers of FIG. 1C.

As vehicle functions supported by network nodes 102 in in-vehicle communication networks including one or more bus-based communication systems 100 evolve, security requirements increase so as to ensure safe and secure operation with respect to communication among the network nodes 102. CAN secure (CANsec) protocol is a data link layer protocol that can be used in order to provide data plane security in a bus-based communication system 100 at the data link layer. The CANsec protocol can be implemented in conjunction with, for example, the CAN XL protocol.

In some scenarios, to facilitate secure communication between network nodes 102 of one or more bus-based communication systems 100 in an in-vehicle communication network, it is desirable for routing of a given message to be prioritized based at least in part on a characteristic of the given message. For example, it may be desirable to prioritize control plane messages (e.g., a security key exchange message, a security key indication message, or the like) over data plane messages (e.g., such that a control plane message is routed before a data plane message). As another example, it may be desirable to prioritize secure data plane messages over non-secure data plane messages (e.g., such that a secure data plane message is routed before a non-secure data plane message). As another example, it may be desirable to prioritize messages associated with a particular SZ over messages associated with another SZ (e.g., such that a message associated with a higher priority SZ is routed before a message associated with a lower priority SZ).

Some implementations described herein provide techniques and apparatuses associated with security aware routing for an in-vehicle communication network comprising one or more bus-based communication systems 100. In some implementations, a device (e.g., a controller) may receive a message provided by a network node included in an in-vehicle communication network. The device may identify one or more characteristics of the message. The one or more characteristics may indicate, for example, a message type of the message, a security property of the message, or an SZ associated with the message. The device may then determine a priority of the message based at least in part on the one or more characteristics, and may provide the message to an output buffer based at least in part on the priority of the message, with the output buffer being one of a plurality of output buffers.

In some implementations, the techniques and apparatuses for security aware routing described herein can be utilized to facilitate secure communication between network nodes of an in-vehicle communication network including one or more bus-based communication systems, while enabling timing requirements associated with message communication to be satisfied through appropriate (security-based) prioritization. Additional details are provided below.

Figure 2:
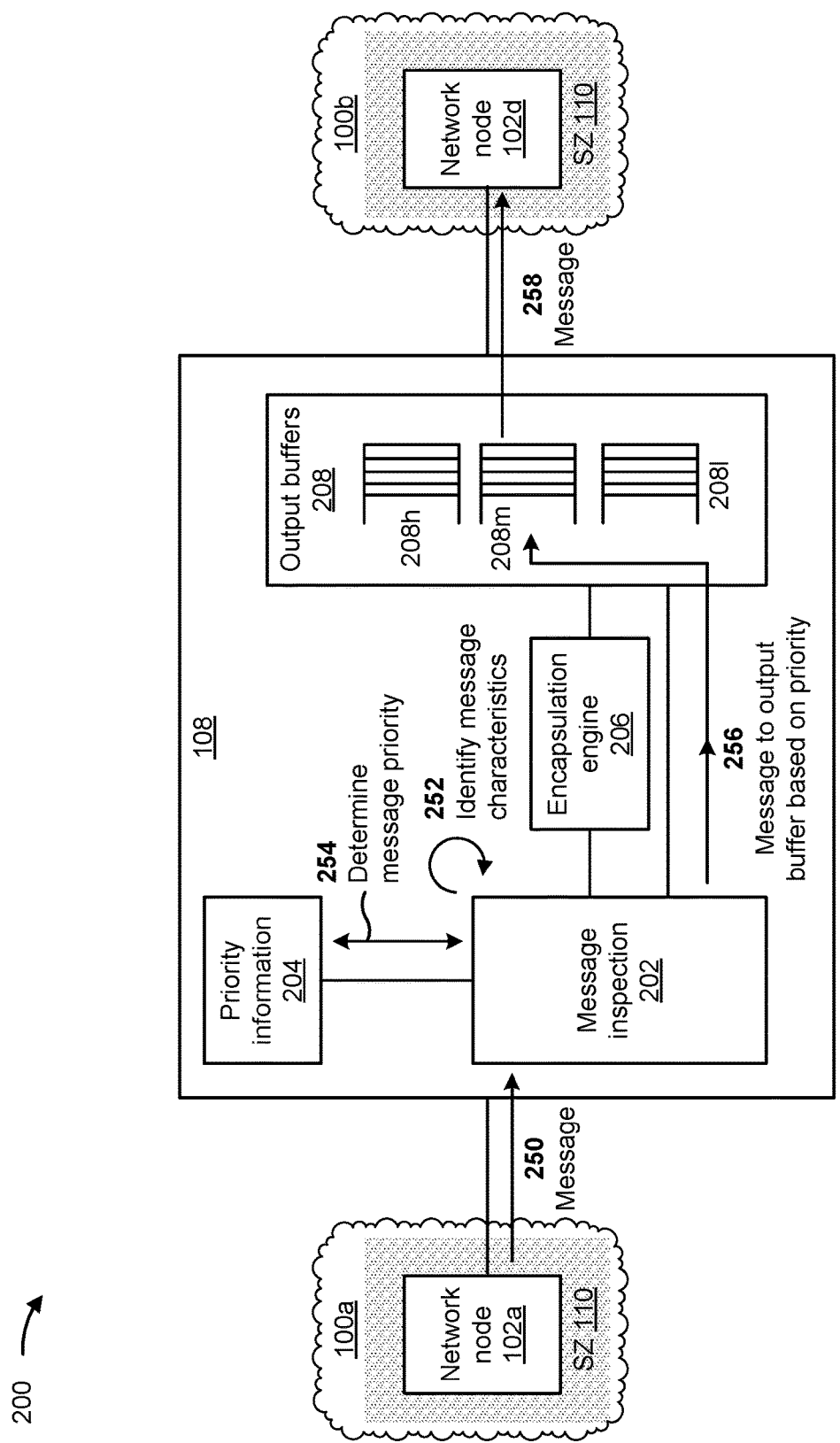
FIG. 2 is a diagram illustrating an example associated with security aware routing in an in-vehicle communication network including one or more bus-based communication systems.

FIG. 2 is a diagram illustrating an example associated with security aware routing in an in-vehicle communication network including one or more bus-based communication systems 100. As shown in FIG. 2, an example 200 comprises communication between a network node 102a, a controller 108, and a network node 102d. In the example shown in FIG. 2, the network node 102a is included in a bus-based communication system 100a, and the network node 102d is included in a bus-based communication system 100b, with the bus-based communication system 100a being connected to the bus-based communication system 100b by the controller 108. In one example, the bus-based communication system 100a may be a first CAN network, the bus-based communication system 100b may be a second CAN network, and the controller 108 may be a routing engine that enables communication between channels of the first CAN network and the second CAN network. As further shown, the network node 102a and the network node 102d are included in an SZ 110 (e.g., an SZ 110 that spans the bus-based communication system 100a and the bus-based communication system 100b).

As shown in FIG. 2, the controller 108 may include one or more components associated with performing security aware routing. For example, the controller 108 may include a message inspection component 202, a priority information component 204, an encapsulation engine 206, and a plurality of output buffers 208. The example components of the controller 108 are described below, followed by an example operation of the controller 108.

The message inspection component 202 includes a component configured to perform one or more operations associated with security aware routing as described herein. For example, the message inspection component 202 may be configured to identify one or more characteristics of a message (e.g., a message receive from a first network node 102a and destined for a second network node 102d), determine a priority of the message based at least in part on the one or more characteristics, and provide the message to an output buffer 208 based at least in part on the priority of the message.

The priority information component 204 includes a component configured with information based at least in part on which the message inspection component 202 can determine a priority for a message. For example, the priority information component 204 component may store information associating one or more SZs 110 with one or more corresponding priorities, one or more SCs 112 with one or more corresponding priorities, one or more SAs with one or more corresponding priorities, or the like. In some implementations, the priority information component 204 may communicate with the message inspection component 202 so as to provide priority information based at least in part on which the message inspection component 202 determines a priority for a message.

The encapsulation engine 206 includes a component configured to encapsulate a message to generate an encapsulated message, as described herein (e.g., to enable tunneling of the message over another network). In some implementations, the encapsulation engine 206 may be configured to selectively apply a security protocol in association with encapsulating the message. For example, the encapsulation engine 206 may be configured to selectively apply the security protocol based at least in part on a characteristic of the message, as described herein.

An output buffer 208 includes a component configured to buffer messages to be transmitted by the controller 108 for reception by network nodes 102. In some implementations, the controller 108 includes a plurality of output buffers 208. In some implementations, a given output buffer 208 of the plurality of output buffers 208 is associated with a particular priority. For example, as indicated in example 200, the controller 108 includes three output buffers 208—a high priority output buffer 208h, a medium priority output buffer 208m, and a low priority output buffer 208l.

In an example operation, starting at reference 250, the controller 108 (e.g., the message inspection component 202) may receive a message provided by the network node 102a in the bus-based communication system 100a (e.g., a first network node 102 in an SZ 110 of an in-vehicle communication network comprising the bus-based communication system 100a and the bus-based communication system 100b). In this example, the message received from the network node 102a is destined for the network node 102d (i.e., a second network node 102 included in the SZ 110 of the in-vehicle communication network).

As shown at reference 252, the controller 108 (e.g., using the message inspection component 202) may identify one or more characteristics of the message. The one or more characteristics of the message are one or more attributes or properties of the message based at least in part on which the controller 108 may determine a priority for the message.

In some implementations, the one or more characteristics include a characteristic indicating a message type of the message. For example, the one or more characteristics may include a characteristic indicating that the message is a control plane message. As another example, the one or more characteristics may include a characteristic indicating that the message is a data plane message. As another example, the one or more characteristics may include a characteristic indicating that the message is a time-critical message (e.g., a message for which a latency requirement should be satisfied). Taking CAN XL as an example, the characteristic indicating that the message is a time-critical message may be included in, for example, an identifier field or an arbitration field of a CAN XL header.

In some implementations, the one or more characteristics include a characteristic indicating a security property associated with the message. For example, the one or more characteristics may include a characteristic indicating that the message is a secure message. As used herein, the term "secure message" may refer to an authenticated and encrypted message or to an authenticated-only message (i.e., authenticated and not encrypted). Thus, as a particular example, the one or more characteristics may include a characteristic indicating that the message is an authenticated and encrypted message. As another particular example, the one or more characteristics may include a characteristic indicating that the message is an authenticated-only message. As another example, the one or more characteristics may include a characteristic indicating that the message is a non-secure message (e.g., that the message is not authenticated or encrypted). In one example combination, the one or more characteristics may include characteristics indicating that the message is a time-critical secure message (e.g., a time-critical authenticated and encrypted message, a time-critical authenticated-only message, or the like).

In some implementations, the one or more characteristics include a characteristic indicating the SZ 110 associated with the message. For example, the one or more characteristics may include a characteristic identifying the SZ 110 associated with the message (e.g., the SZ 110 within which the network node 102a and the network node 102d are included). As another example, the one or more characteristics may include a characteristic identifying an SC 112 associated with the message (e.g., an SC 112 of the SZ 110 via which the message is to be communicated). As another example, the one or more characteristics may include a characteristic identifying an SA associated with the message (e.g., an SA associated with the SC 112 of the SZ 110).

In some implementations, the controller 108 may determine the one or more characteristics based at least in part on inspecting the message (e.g., by inspecting one or more fields of a CAN XL frame). For example, the controller 108 may inspect a security bit in a control field of the message (e.g., an SEC bit in a control field of a CAN XL frame) or a header of the message (e.g., an L2+ field in a header of a CAN XL frame) to identify whether the message is a secure message (e.g., authenticated-only, authenticated and encrypted, or the like) or is a non-secure message. As another example, the controller 108 may inspect a set of SCI bits in a header of the message (e.g., a set of CAN SCI bits in a header of a CAN XL frame) to identify the SC 112 associated with the message. As another example, the controller 108 may inspect a control indication bit of the message (e.g., a control indication bit in a CAN XL frame) to identify whether the message is a control plane message or a data plane message.

As shown at reference 254, the controller 108 (e.g., using the message inspection component 202 and/or the priority information component 204) may determine a priority of the message. In some implementations, the priority of the message indicates a priority based at least in part on which the message is to be buffered for transmission by the controller 108. That is, the priority of the message may indicate a level of urgency with which the message should be transmitted for reception by a destination network node 102.

In some implementations, the controller 108 may determine the priority of the message based at least in part on the one or more characteristics associated with the message. For example, the controller 108 may in some implementations determine the priority of the message based at least in part on the message being a control plane message (e.g., when control plane messages are prioritized over data plane messages). As another example, the controller 108 may in some implementations determine the priority of the message based at least in part on the message being a data plane message (e.g., when data plane messages are prioritized lower than control plane messages). As another example, the controller 108 may in some implementations determine the priority of the message based at least in part on the message being a time-critical message (e.g., when time-critical messages are prioritized over non-time-critical messages). As another example, the controller 108 may in some implementations determine the priority of the message based at least in part on the message being associated with a particular SZ 110 (e.g., when some SZs 110 have a higher priority than other SZs 110). As another example, the controller 108 may in some implementations determine the priority of the message based at least in part on the message being associated with a particular SC 112 (e.g., when some SCs 112 have a higher priority than other SCs 112). As another example, the controller 108 may in some implementations determine the priority of the message based at least in part on the message being associated with a particular SA (e.g., when some SAs have higher priority than other SAs). As another example, the controller 108 may in some implementations determine the priority of the message based at least in part on the message being a secure message (e.g., when secure messages are prioritized over non-secure messages). As another example, the controller 108 may in some implementations determine the priority of the message based at least in part on the message being a non-secure message (e.g., when non-secure messages are prioritized lower than secure messages). In some implementations, the controller 108 may determine the priority based on a combination of two or more characteristics of the messages. In some implementations, the characteristic(s) based on which the controller 108 determines the priority may be configured as suitable for a given application.

In some implementations, the controller 108 may identify the one or more characteristics of the message and communicate with the priority information component 204 in association with identifying the priority. For example, the priority information component 204 may store or have access to a table that associates one or more SCs 112 with one or more corresponding priorities (e.g., a table that associates an SCI corresponding to a first SC 112 with a high priority, an SCI corresponding to a second SC 112 with a medium priority, an SCI corresponding to a third SC 112 with the high priority, an SCI corresponding to a fourth SC 112 with a low priority, or the like). In this example, the controller 108 may identify a characteristic (e.g., an SCI) that indicates an SC 112 associated with the message and may determine the priority for the message based at least in part on an association included in the table.

As another example, the priority information component 204 may store or have access to a table that associates one or more SZs 110 with one or more corresponding priorities (e.g., a table that associates an SZ identifier (SZI) corresponding to a first SZ 110 with a high priority, an SZI corresponding to a second SZ 110 with a medium priority, an SZI corresponding to a third SZ 110 with a low priority, or the like). In this example, the controller 108 may identify a characteristic (e.g., an SZI) that indicates the SZ 110 associated with the message and may determine the priority for the message based at least in part on an association included in the table.

As another example, the priority information component 204 may store or have access to a table that associates one or more SAs with one or more corresponding priorities (e.g., a table that associates an SA identifier (SAI) corresponding to a first SA associated with a first SC 112 with a high priority, an SAI corresponding to a second SA associated with the first SC 112 with a medium priority, an SAI corresponding to a third SA associated with a second SC 112 with the high priority, an SAI corresponding to a fourth SA associated with the second SC 112 with a low priority, or the like). In this example, the controller 108 may identify a characteristic (e.g., an SAI) that indicates an SA associated with the message and may determine the priority for the message based at least in part on an association included in the table.

In some implementations, the controller 108 may determine the priority further based at least in part on a characteristic of one or more output buffers 208. For example, the controller 108 may in some implementations determine the priority of the message based at least in part on a number of messages in an output buffer 208. As particular example, the controller 108 may include three output buffers 208—a high priority output buffer 208*h*, a medium priority output buffer 208*m*, and a low priority output buffer 208*l*. In this example, as part of determining a priority for a message, the controller 108 may identify a number of messages in the high priority output buffer 208*h* (i.e., how many high priority messages are buffered for transmission). Here, assume that the one or more characteristics of the message indicate that the message is a secure data plane message, and that the controller 108 is configured to determine the high priority for secure data plane messages if the number of messages in the high priority output buffer 208*h* satisfies a threshold (e.g., is less than or equal to a threshold number of messages) or, alternatively, is to determine the medium priority for secure data plane messages if the number of messages in the high priority output buffer 208*h* does not satisfy the threshold (e.g., is greater than the threshold number of messages). In this example if the number of messages in the high priority output buffer 208*h* satisfies the threshold, then the controller 108 determines the high priority for the secure data plane message. Conversely, if the number of messages in the high priority output buffer 208*h* fails to satisfy the threshold, then the controller 108 determines the medium priority for the secure data plane message. As illustrated by this example a characteristic of an output buffer 208 may in some implementations not be the only basis on which the controller 108 determines a priority of a message. That is, the controller 108 may be configured to determine a first priority for a message that has a particular set of characteristics (e.g., a particular type of message, a particular security property, or the like) when an output buffer 208 associated with the first priority has a number of messages that satisfies the threshold (e.g., a relatively low number of messages awaiting transmission) and, conversely, to assign a second (different) priority to the message when the output buffer 208 associated with the first priority has a number of messages that fails to satisfy the threshold (e.g., a relatively high number of messages awaiting transmission). Notably, the controller 108 may in some implementations determine a priority of a message based at least in part on one or more characteristics of one or more output buffers 208 other than or in addition to a number of buffered messages. For example, the controller 108 may in some implementations be configured to determine a priority of a message based at least in part on an amount of available memory in one or more output buffers 208, or some other characteristic, attribute, or property of the one or more output buffers 208.

In some implementations, the controller 108 may determine the priority based at least in part on an algorithm that receives information associated with the one or more characteristics of the message and/or one or more characteristics of one or more output buffers 208 as input, and provides an indication of the priority as output. For example, the controller 108 may be configured with an algorithm that receives, as input, an indication of a message type, an indication of whether the message is a secure message, an indication of the SZ 110 associated with the message, and an indication of a number of messages in a high priority output buffer 208, and provides an indication of the priority for the message as output, with the algorithm being configured to determine the priority based on the input characteristics.

In some implementations, the controller 108 may determine the same priority for messages having different characteristics. That is, the controller 108 may in some implementations be configured such that a first message having a first set of characteristics and a second message having a second (different) set of characteristics are determined to have the same priority. For example, in some implementations, the controller 108 may determine the same priority (e.g., high priority) for both a control plane message and a data plane message (i.e., messages of different types), and may provide the control plane message and the data plane message to the same output buffer 208 (e.g., the high priority output buffer 208*h*). Additionally, or alternatively, the controller 108 may determine different priorities for messages having different characteristics. That is, the controller 108 may in some implementations be configured such that a first message having a first set of characteristics and a second message having a second (different) set of characteristics are determined to have different priorities. For example, in some implementations, the controller 108 may determine a high priority for a control plane message and may determine a low priority for a data plane message (i.e., messages of different types). Here, the controller 108 may provide the control plane message to the high priority output buffer 208*h* and the data plane message to the low priority output buffer 208*l*. In some implementations, the priority for a given message may be determined based at least in part on one or more characteristics of one or more output buffers 208 as described above and, therefore, a priority of a given message may depend on one or more factors other than the one or more characteristics of the message.

As shown at reference 256, the controller 108 (e.g., the message inspection component 202) may provide the message to an output buffer 208 based at least in part on the priority of the message. For example, with reference to example 200, if the controller 108 determines the high priority for the message, then the controller 108 may provide the message to the high priority output buffer 208*h*. As another example, if the controller 108 determines the medium priority for the message, then the controller 108 may provide the message to the medium priority output buffer 208*m*. As another example, if the controller 108 determines the low priority for the message, then the controller 108 may provide the message to the low priority output buffer 208*l*.

In some implementations, the controller 108 (e.g., using the encapsulation engine 206) may encapsulate the message to generate an encapsulated message. In some implementations, an encapsulated message is a message generated for the purpose of message tunneling. For example, if the message is a CAN XL message that is to be provided over an Ethernet-based network, then the controller 108 may encapsulate the message to generate an encapsulated message that is suitable for transmission over the Ethernet-based network. In some implementations, the controller 108 may selectively apply a security protocol in association with encapsulating the message. For example, if the one or more characteristics include a security property indicating that the message is a secure message (e.g., that the message is CANsec secured), then the controller 108 may be configured to refrain from applying a security protocol (e.g., an Ethernet security protocol, such as MACsec) in association with encapsulating the message. Conversely, if the one or more characteristics include a security property indicating that the message is a non-secure message (e.g., that the message is not CANsec secured), then the controller 108 may apply the security protocol in association with encapsulating the message. In some implementations, the plurality of output buffers 208 may include one or more output buffers 208 dedicated to buffering encapsulated messages.

As shown at reference 258, the controller 108 (e.g., using the output buffer 208) may transmit the message for reception by the network node 102*d*. That is, the controller 108 may transmit the buffered message for reception by the network node 102*d*. In some implementations, the controller 108 transmits messages from output buffers 208 based at least in part on the priorities associated with the output buffers 208 (e.g., such that a given high priority message is transferred before any medium priority or low priority messages, such that a latency requirement associated with a given high priority message is satisfied, or the like).

In this way, security aware priority-based routing can be utilized to facilitate secure communication between network nodes 102 of one or more bus-based communication systems 100 in an in-vehicle communication network, while enabling timing requirements associated with message communication to be satisfied.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3A:
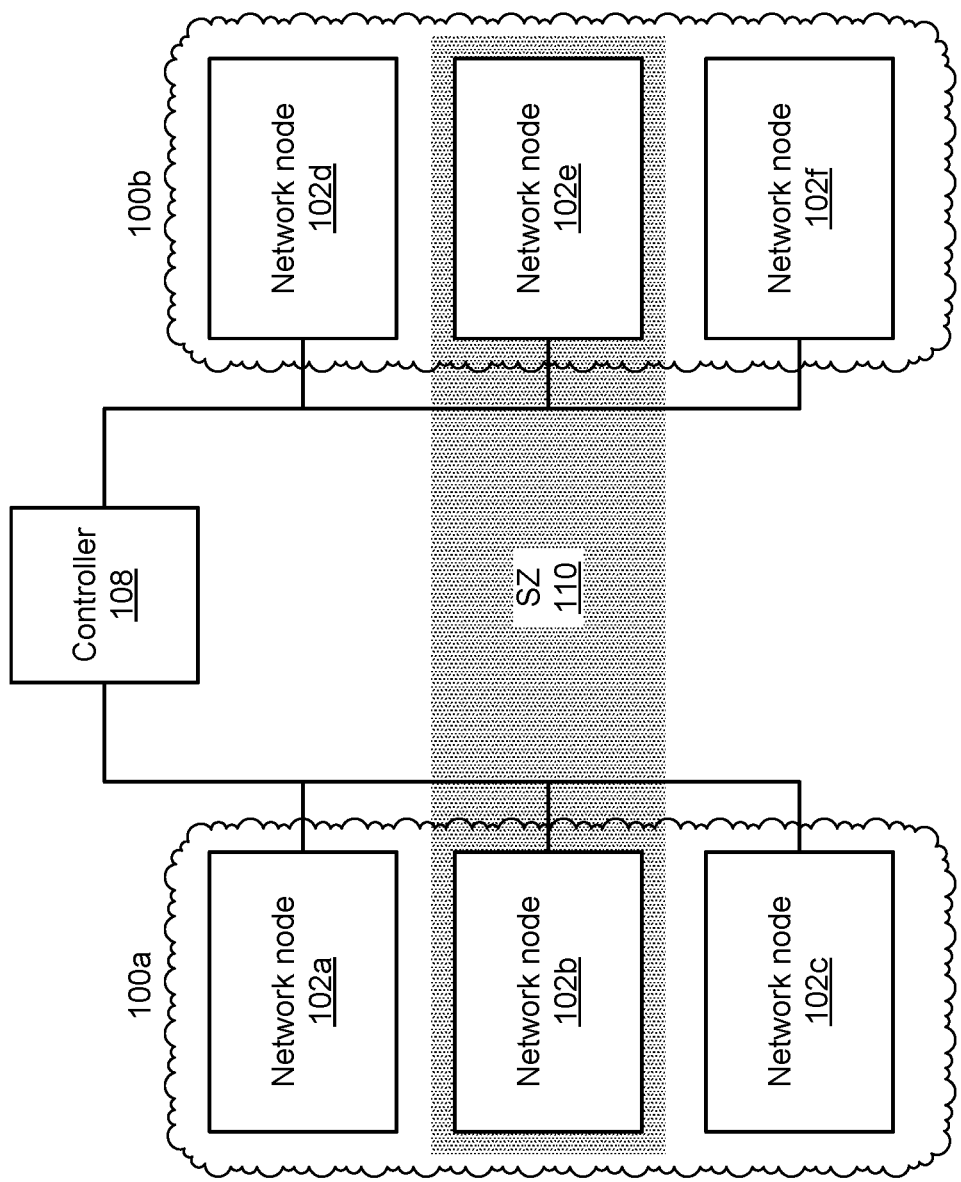
FIGS. 3A-3C are diagrams illustrating example scenarios in which security aware routing described herein may be implemented.
Figure 3B:
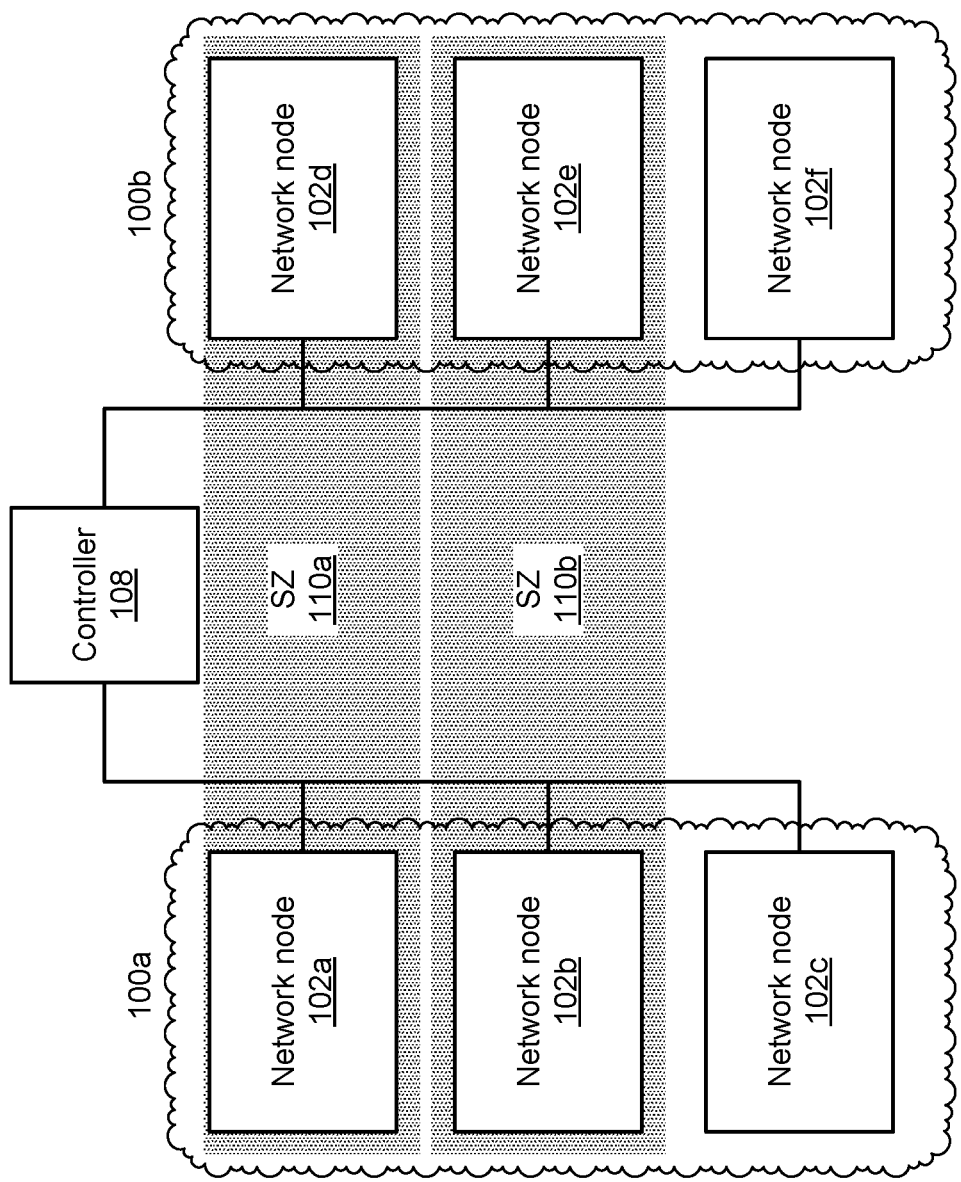
Figure 3C:
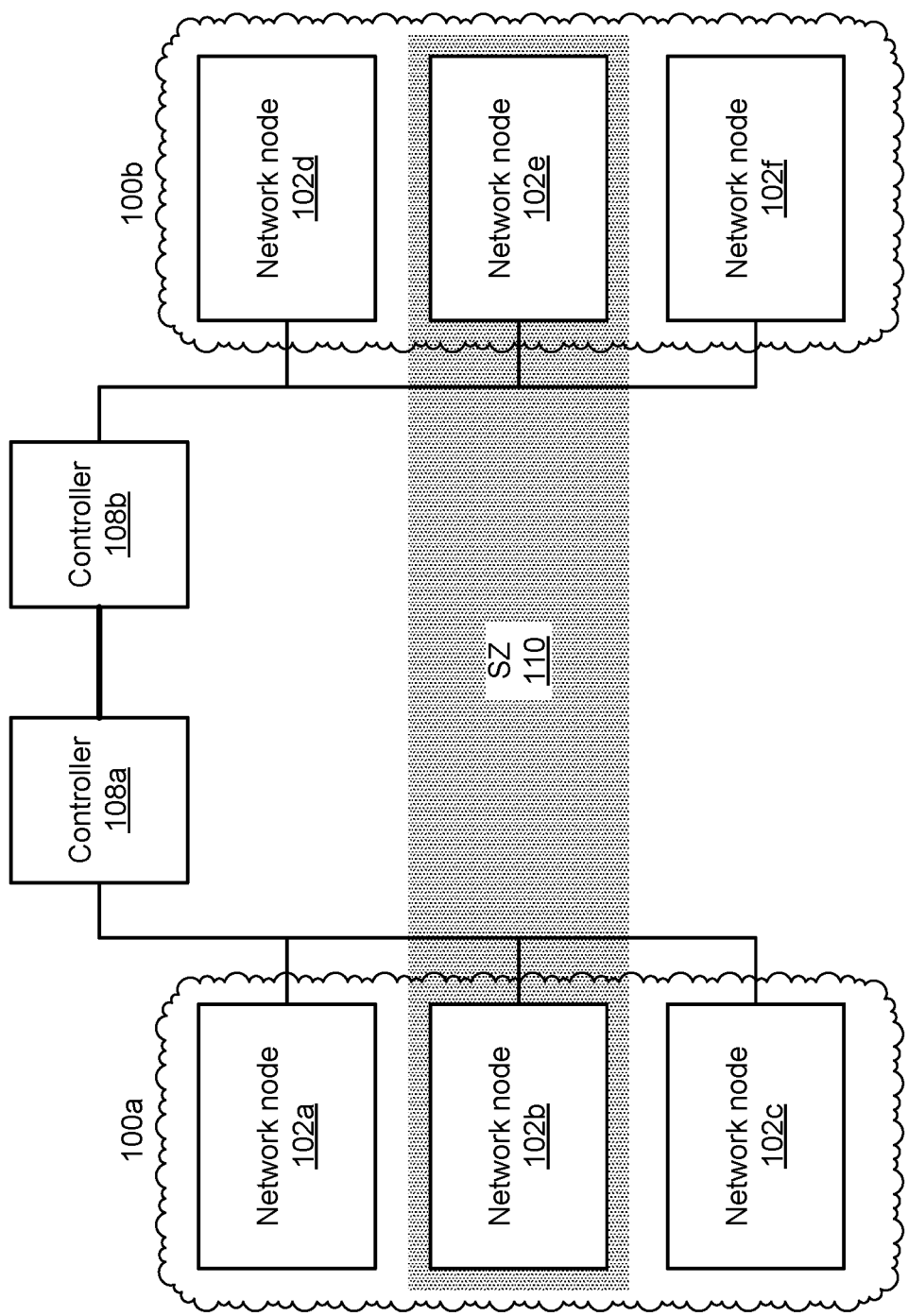

FIGS. 3A-3C are diagrams illustrating example scenarios in which security aware routing described herein may be implemented.

In the example shown in FIG. 3A, an in-vehicle communication network includes a first bus-based communication system 100*a* (e.g., a first CAN network) including a group of network nodes 102*a* through 102*c* and a second bus-based communication system 100*b* (e.g., a second CAN network) including a group of network nodes 102*d* through 102*f*, with the first bus-based communication system 100*a* and the second bus-based communication system 100*b* being connected by a controller 108 (e.g., a CAN bridge). In this example, the network node 102*b* and network node 102*e* are within an SZ 110 defined by one or more SCs 112 (not shown). The techniques for security aware routing described herein can be used in this example scenario by the controller 108 for routing of messages between the network nodes 102 of the bus-based communication system 100*a* and the bus-based communication system 100*b*, thereby providing priority-based and security aware routing of, for example, control plane messages or secure data plane messages among the network nodes 102.

In the example shown in FIG. 3B, an in-vehicle communication network includes a first bus-based communication system 100*a* (e.g., a first CAN network) including a group of network nodes 102*a* through 102*c* and a second bus-based communication system 100*b* (e.g., a second CAN network) including a group of network nodes 102*d* through 102*f*, with the first bus-based communication system 100*a* and the second bus-based communication system 100*b* being connected by a controller 108 (e.g., a CAN bridge). In this example, the network node 102*a* and the network node 102*d* are within an SZ 110*a* defined by one or more SCs 112 (not shown), and the network node 102*b* and network node 102*e* are within an SZ 110*b* defined by one or more other SCs 112 (not shown). The techniques for security aware routing described herein can be used in this example scenario by the controller 108 for routing of messages between the network nodes 102 of the bus-based communication system 100*a* and the bus-based communication system 100*b*, thereby providing priority-based and security aware routing of, for example, control plane messages or secure data plane messages per SZ 110 among the network nodes 102.

In the example shown in FIG. 3C, an in-vehicle communication network includes a first bus-based communication system 100a (e.g., a first CAN network) including a group of network nodes 102a through 102c and a second bus-based communication system 100b (e.g., a second CAN network) including a group of network nodes 102d through 102f, with the first bus-based communication system 100a being connected to a first controller 108a and the second bus-based communication system 100b being connected to a second controller 108. As shown, in this example the first controller 108a and the second controller are connected to one another (e.g., via an Ethernet connection, to form a CAN-Ethernet-CAN in-vehicle communication network). In this example, the network node 102b and network node 102e are within an SZ 110 defined by one or more SCs 112 (not shown). The techniques for security aware routing described herein can be used in this example scenario by the controller 108a or the controller 108b for routing of messages between the network nodes 102, thereby providing priority-based and security aware routing of, for example, control plane messages or secure data plane messages and across heterogenous networks with encapsulation/de-encapsulation, as needed.

As indicated above, FIGS. 3A-3C are provided as an example. Other examples may differ from what is described with regard to FIGS. 3A-3C. The number and arrangement of devices shown in FIGS. 3A-3C are provided as an example. In practice, there may be additional devices, fewer devices, different devices, or differently arranged devices than those shown in FIGS. 3A-3C. Furthermore, two or more devices shown in FIGS. 3A-3C may be implemented within a single device, or a single device shown in FIGS. 3A-3C may be implemented as multiple, distributed devices. Additionally, or alternatively, a set of devices (e.g., one or more devices) shown in FIGS. 3A-3C may perform one or more functions described as being performed by another set of devices shown in FIGS. 3A-3C.

Figure 4:
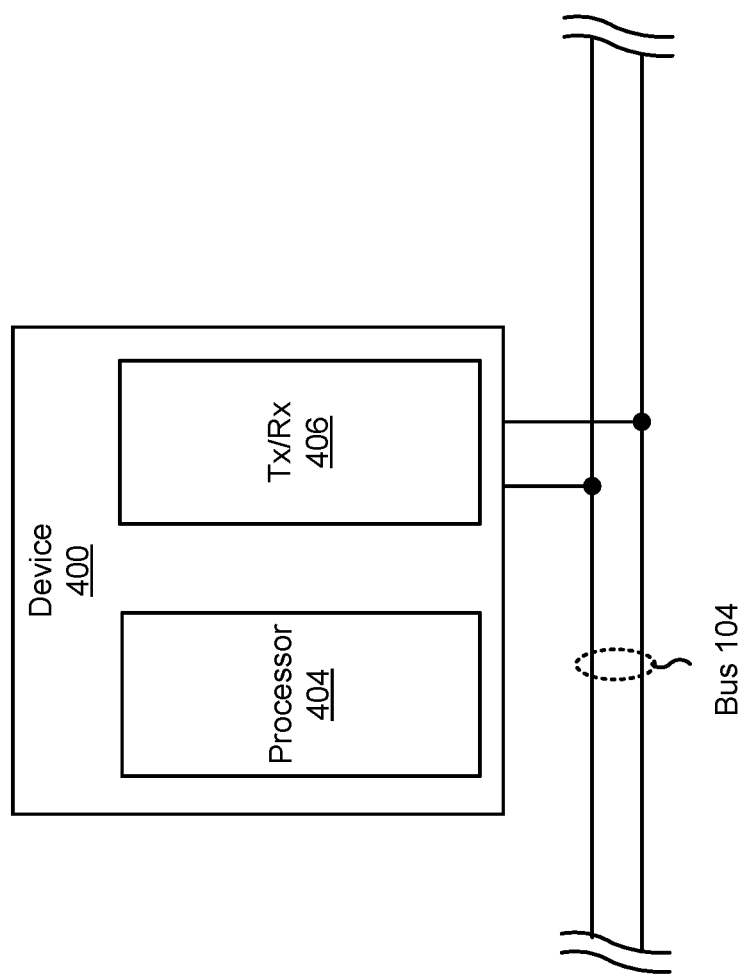
FIGS. 4 and 5 are diagrams of example components of devices associated with security aware routing in an in-vehicle communication network.

FIG. 4 is a diagram of an example of a device 400 associated with security aware routing in an in-vehicle communication network. In some implementations, the device 400 may correspond to a network node 102. As shown in FIG. 4, the device 400 may include a processor 404 and a transceiver (e.g., Tx/Rx) 406 connected to a communication bus 104 (e.g., a CAN bus).

The device 400 may include one or more devices associated with controlling one or more other devices and/or one or more electrical systems and/or electrical subsystems based, for example, on sensor data provided by sensors connected to the device 400 via a sensor interface component of the device 400 (not shown), control data for controlling actuators connected to the device 400 via an actuator interface component of node (not shown), and/or the like. In a vehicle system, for example, the device 400 may include an ECU, an ECM, a PCM, a TCM, a BCM, a CCM, a CTM, a GEM, a BCM, a SCM, or another type of electrical system or electrical subsystem of a vehicle.

Processor 404 includes a device (e.g., one or more integrated circuits) that operates as an embedded system for providing the control functionality associated with the device 400. For example, processor 404 includes one or more central processing units (CPUs), memories, and/or programmable input/output (I/O) peripherals that allow processor 404 to operate as an embedded system. In some examples, processor 404 may send information to and/or receive information from transceiver 406.

Transceiver 406 includes a component via which the device 400 may transmit and receive information. For example, transceiver 406 may include a differential line transceiver, or a similar type of component. In some examples, transceiver 406 includes a transmit (Tx) component that allows the device 400 to transmit information (e.g., to another node) via communication bus 104, and/or a receive (Rx) component that allows the device 400 to receive information (e.g., from another node that is similar to the device 400) via communication bus 104. In some examples, transceiver 406 may include a line driver for enabling the Tx component (to transmit information) or the Rx component (to receive information) at a given time. In some examples, transceiver 406 may be a CAN transceiver, a LIN transceiver, a FlexRay transceiver, an Ethernet transceiver, or another type of transceiver associated with another type of bus system. In some examples, the device 400 may include multiple transceivers 406 of different types.

Communication bus 104 includes a bus for carrying information from or to the device 400. In some examples, communication bus 104 may comprise a connection (e.g., including one or more terminals, wires, and/or connectors) via which multiple network nodes 102 are connected to one another. In some examples, communication bus 104 may include a set of connections, each associated with one or more network nodes 102. In some examples, communication bus 104 may be a CAN bus, a CAN FD bus, a CAN XL bus, a LIN bus, a FlexRay bus, an Ethernet bus, and/or another type of bus. In some examples, each transceiver 406 of the device 400 may be connected to an associated communication bus 104.

The number and arrangement of devices and components shown in FIG. 4 is provided as an example. In practice, there may be additional devices and/or components, fewer devices and/or components, different devices and/or components, or differently arranged devices and/or components than those shown in FIG. 4. Furthermore, two or more devices and/or components shown in FIG. 4 may be implemented within a single device and/or component, or a single device and/or a single component shown in FIG. 4 may be implemented as multiple, distributed devices and/or components. Additionally, or alternatively, a set of devices and/or components (e.g., one or more devices and/or components) of FIG. 4 may perform one or more functions described as being performed by another set of devices and/or components of FIG. 4.

Figure 5:
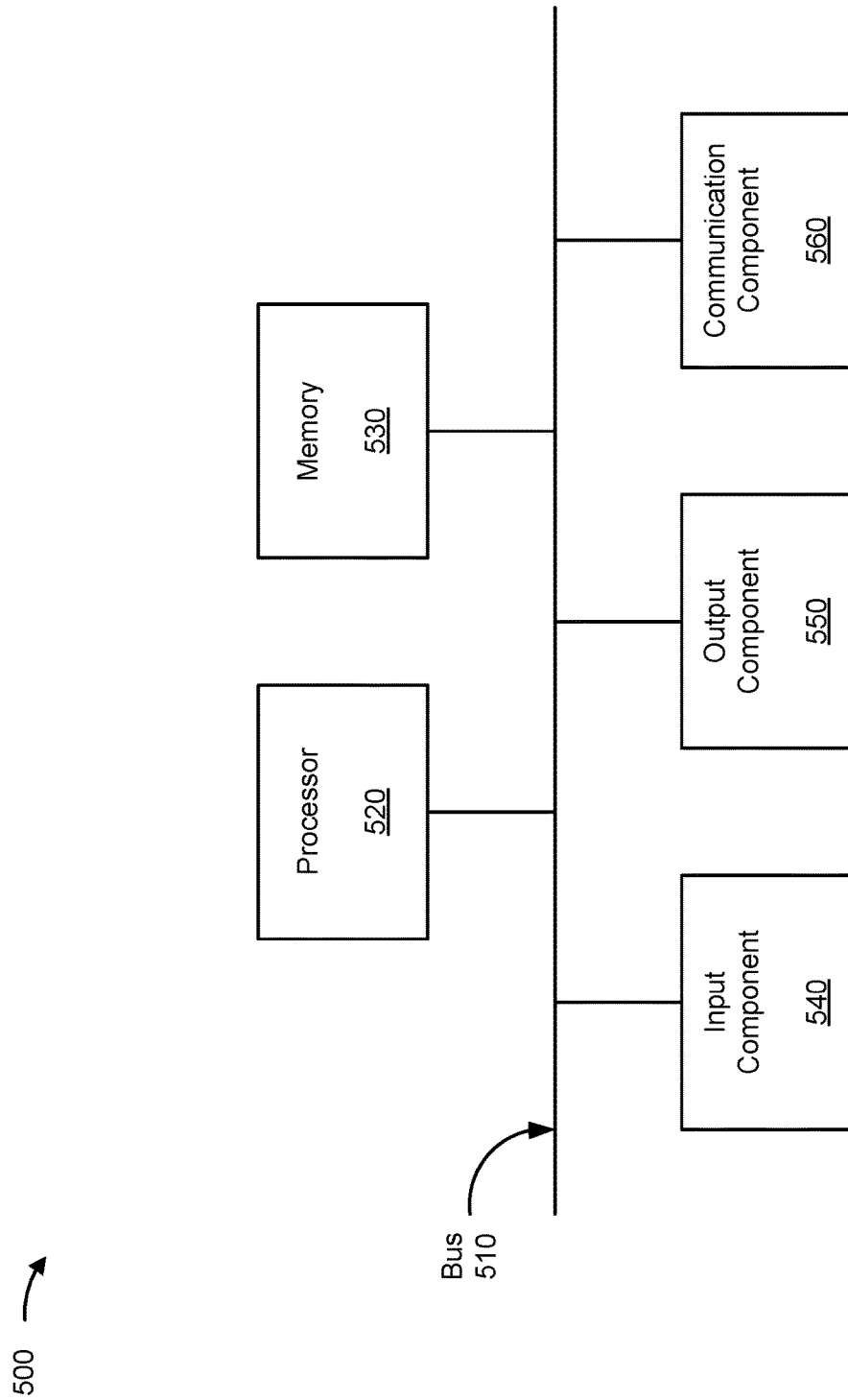

FIG. 5 is a diagram of example components of a device 500 associated with security aware routing in an in-vehicle communication network. The device 500 may correspond to controller 108. In some implementations, the controller 108 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

FIG. 6 is a flowchart of an example process 600 associated with security aware routing in an in-vehicle communication network. In some implementations, one or more process blocks of FIG. 6 are performed by a controller (e.g., controller 108). In some implementations, one or more process blocks of FIG. 6 are performed by another device or a group of devices separate from or including the controller, such as a network node (e.g., a network node 102). Additionally, or alternatively, one or more process blocks of FIG. 6 may be performed by one or more components of the controller (e.g., a message inspection component 202, a priority information component 204, an encapsulation engine 206, and/or an output buffer 208). Additionally, or alternatively, one or more process blocks of FIG. 6 may be performed by one or more components of a device 500 as shown in FIG. 5.

As shown in FIG. 6, process 600 may include receiving a message provided by a network node included in an in-vehicle communication network (block 610). For example, the controller may receive a message provided by a network node included in an in-vehicle communication network, as described above.

As further shown in FIG. 6, process 600 may include identifying one or more characteristics of the message, the one or more characteristics indicating at least one of a message type of the message, a security property of the message, or an SZ associated with the message (block 620). For example, the controller may identify one or more characteristics of the message, the one or more characteristics indicating at least one of a message type of the message, a security property of the message, or an SZ (e.g., an SZ 110) associated with the message, as described above.

As further shown in FIG. 6, process 600 may include determining a priority of the message based at least in part on the one or more characteristics (block 630). For example, the controller may determine a priority of the message based at least in part on the one or more characteristics, as described above.

As further shown in FIG. 6, process 600 may include providing the message to an output buffer based at least in part on the priority of the message, the output buffer being one of a plurality of output buffers (block 640). For example, the controller may provide the message to an output buffer based at least in part on the priority of the message, the output buffer being one of a plurality of output buffers, as described above.

Process 600 may include additional implementations, such as any single implementation or any combination of implementations described below and/or in connection with one or more other processes described elsewhere herein.

In a first implementation, the one or more characteristics include a message type indicating that the message is a control plane message and the priority of the message is determined based at least in part on the message being a control plane message.

In a second implementation, alone or in combination with the first implementation, the one or more characteristics include a message type indicating that the message is a data plane message and the priority of the message is determined based at least in part on the message being a data plane message.

In a third implementation, alone or in combination with one or more of the first and second implementations, the one or more characteristics include information identifying the SZ associated with the message as a particular SZ and the priority of the message is determined based at least in part on the message being associated with the particular SZ.

In a fourth implementation, alone or in combination with one or more of the first through third implementations, the one or more characteristics include information identifying a SC associated with the message as a particular SC (e.g., an SC 112) and the priority of the message is determined based at least in part on the message being associated with the particular SC.

In a fifth implementation, alone or in combination with one or more of the first through fourth implementations, the one or more characteristics include information identifying an SA associated with the message as a particular SA and the priority of the message is determined based at least in part on the message being associated with the particular SA.

In a sixth implementation, alone or in combination with one or more of the first through fifth implementations, the one or more characteristics include a security property indicating that the message is a non-secure message and the priority of the message is determined based at least in part on the message being a non-secure message.

In a seventh implementation, alone or in combination with one or more of the first through sixth implementations, the one or more characteristics include a security property indicating that the message is a secure message and the priority of the message is determined based at least in part on the message being a secure message.

In an eighth implementation, alone or in combination with one or more of the first through seventh implementations, the one or more characteristics include a message type indicating that the message is a time-critical message and the priority of the message is determined based at least in part on the message being a time-critical message.

In a ninth implementation, alone or in combination with one or more of the first through eighth implementations, process 600 further comprises encapsulating the message to generate an encapsulated message, wherein the one or more components are configured to refrain from applying a security protocol in association with encapsulating the message based at least in part on the one or more characteristics including a security property indicating that the message is a secure message.

In a tenth implementation, alone or in combination with one or more of the first through ninth implementations, process 600 further comprises encapsulating the message to generate an encapsulated message, wherein the one or more components are configured to apply a security protocol in association with encapsulating the message based at least in part on the one or more characteristics including a security property indicating that the message is a non-secure message.

In an eleventh implementation, alone or in combination with one or more of the first through tenth implementations, a characteristic of the message is different from a characteristic of a second message, the priority of the message is the same as a priority of the second message, and the first message and the second message are provided to the same output buffer of the plurality of output buffers.

In a twelfth implementation, alone or in combination with one or more of the first through eleventh implementations, a characteristic of the message is different from a characteristic of a second message, the priority of the message is different from a priority of the second message, and the first message and the second message are provided to different output buffers.

In a thirteenth implementation, alone or in combination with one or more of the first through twelfth implementations, the priority of the message is determined based at least in part on a number of messages in a first output buffer of the plurality of output buffers, the first output buffer being associated with a first priority.

In a fourteenth implementation, alone or in combination with one or more of the first through thirteenth implementations, the priority of the message is determined to be the first priority when the number of messages in the first output buffer satisfies a threshold.

In a fifteenth implementation, alone or in combination with one or more of the first through fourteenth implementations, the priority of the message is determined to be a second priority when the number of messages in the first output buffer fails to satisfy a threshold.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a controller included in an in-vehicle communication network, a message provided by a network node included in the in-vehicle communication network;
   identifying, by the controller, information indicating a secure zone (SZ) related to the message,
      wherein the SZ is defined by a set of secure channels (SCs) between a plurality of network nodes, including the network node, associated with the in-vehicle communication network;
   identifying, by the controller, one or more characteristics of the message, the one or more characteristics indicating at least one of:
      a message type of the message, or
      a security property of the message;
   determining, by the controller, a priority of the message based at least in part on the information and the one or more characteristics; and
   providing, by the controller, the message to an output buffer based at least in part on the priority of the message, the output buffer being one of a plurality of output buffers.

2. The method of claim 1, wherein the one or more characteristics include the message type,
   wherein the message type indicates that the message is either a control plane message or a data plane message, and
   wherein the priority of the message is determined based at least in part on the message being either a control plane message or a data plane message.

3. The method of claim 1, wherein the one or more characteristics include information identifying the SZ associated with the message as a particular SZ, and
   wherein the priority of the message is determined based at least in part on the message being associated with the SZ.

4. A controller, comprising:
   one or more components configured to:
      identify information indicating a secure zone (SZ) related to a message associated with an in-vehicle network,
         wherein the SZ is defined by a set of secure channels (SCs) between a plurality of network nodes associated with the in-vehicle network;
      identify one or more characteristics of a message, the one or more characteristics indicating at least one of:
         a message type of the message, or
         a security property of the message;
      determine a priority of the message based at least in part on the information and the one or more characteristics; and
      provide the message to an output buffer based at least in part on the priority of the message.

5. An in-vehicle communication network controller, comprising:
   one or more components configured to:
      receive a message provided by a network node included in an in-vehicle communication network;
      identify information indicating a secure zone (SZ) related to the message,
         wherein the SZ is defined by a set of secure channels (SCs) between a plurality of network nodes, including the network node, associated with the in-vehicle communication network;
      identify one or more characteristics of the message, the one or more characteristics indicating at least one of:
         a message type of the message, or
         a security property of the message;
      determine a priority of the message based at least in part on the information and the one or more characteristics; and
      provide the message to an output buffer based at least in part on the priority of the message, the output buffer being one of a plurality of output buffers.

6. The in-vehicle communication network controller of claim 5, wherein the one or more characteristics include a message type indicating that the message is a control plane message and the priority of the message is determined based at least in part on the message being a control plane message.

7. The in-vehicle communication network controller of claim 5, wherein the one or more characteristics include the message type,
   wherein the message type indicates that the message is a data plane message, and
   wherein the priority of the message is determined based at least in part on the message being a data plane message.

8. The in-vehicle communication network controller of claim 5, wherein the one or more characteristics include information identifying the SZ associated with the message as a particular SZ and the priority of the message is determined based at least in part on the message being associated with the particular SZ.

9. The in-vehicle communication network controller of claim 5, wherein the one or more characteristics include information identifying a particular SC of the set of SCs, and
   wherein the priority of the message is determined based at least in part on the message being associated with the particular SC.

10. The in-vehicle communication network controller of claim 5, wherein the one or more characteristics include information identifying a secure association (SA) associated with the message as a particular SA and the priority of the message is determined based at least in part on the message being associated with the particular SA.

11. The in-vehicle communication network controller of claim 5, wherein the one or more characteristics include the security property,
    wherein the security property indicates that the message is a non-secure message, and
    wherein the priority of the message is determined based at least in part on the message being a non-secure message.

12. The in-vehicle communication network controller of claim 5, wherein the one or more characteristics include the security property,
    wherein the security property indicates that the message is a secure message and,
    wherein the priority of the message is determined based at least in part on the message being a secure message.

13. The in-vehicle communication network controller of claim 5, wherein the one or more characteristics include the message type,
    wherein the message type indicates that the message is a time-critical message, and wherein the priority of the message is determined based at least in part on the message being a time-critical message.

14. The in-vehicle communication network controller of claim 5, wherein the one or more components are further to encapsulate the message to generate an encapsulated message,
   wherein the one or more components are configured to refrain from applying a security protocol in association with encapsulating the message based at least in part on the one or more characteristics including the security property, and
   wherein the security property indicates that the message is a secure message.

15. The in-vehicle communication network controller of claim 5, wherein the one or more components are further to encapsulate the message to generate an encapsulated message,
   wherein the one or more components are configured to apply a security protocol in association with encapsulating the message based at least in part on the one or more characteristics including the security property, and
   wherein the security property indicates that the message is a non-secure message.

16. The in-vehicle communication network controller of claim 5, wherein a characteristic of the message is different from a characteristic of a second message, the priority of the message is the same as a priority of the second message, and the message and the second message are provided to the same output buffer of the plurality of output buffers.

17. The in-vehicle communication network controller of claim 5, wherein a characteristic of the message is different from a characteristic of a second message, the priority of the message is different from a priority of the second message, and the message and the second message are provided to different output buffers.

18. The in-vehicle communication network controller of claim 5, wherein the priority of the message is determined based at least in part on a number of messages in a first output buffer of the plurality of output buffers, the first output buffer being associated with a first priority.

19. The in-vehicle communication network controller of claim 18, wherein the priority of the message is determined to be the first priority when the number of messages in the first output buffer satisfies a threshold.

20. The in-vehicle communication network controller of claim 18, wherein the priority of the message is determined to be a second priority when the number of messages in the first output buffer fails to satisfy a threshold.

* * * * *